INVENTOR.
JAMES R. MAY
By Spencer, Hardman & Fehr
HIS ATTORNEYS

May 16, 1950  J. R. MAY  2,507,671
PROPELLER CONTROL
Filed Nov. 8, 1947  7 Sheets-Sheet 3

INVENTOR.
JAMES R. MAY
By
Spencer, Hardman & Fehr
HIS ATTORNEYS

Fig. 7

May 16, 1950 J. R. MAY 2,507,671
PROPELLER CONTROL
Filed Nov. 8, 1947 7 Sheets-Sheet 5

INVENTOR
JAMES R. MAY
BY
Spencer, Hardman & Fehr
HIS ATTORNEYS

May 16, 1950  J. R. MAY  2,507,671
PROPELLER CONTROL

Filed Nov. 8, 1947  7 Sheets-Sheet 6

INVENTOR
JAMES R. MAY
BY
Spencer, Hardman & Fehr
HIS ATTORNEYS

Patented May 16, 1950

2,507,671

UNITED STATES PATENT OFFICE 2,507,671

PROPELLER CONTROL

James R. May, Dayton, Ohio, assignor to General Motors Corporation, Detroit, Mich., a corporation of Delaware Application November 8, 1947, Serial No. 784,887

9 Claims. (Cl. 170—160.21)

This invention relates to control of aircraft propellers, particularly to the control of blade pitch to meet the varied requirements in flight and surface maneuvering preparatory to flight.

It is an object to provide a system of control for aircraft propellers that embraces the full range of blade shifts from any selected governed positive pitch to and through negative, feathering and return to working range, by a self contained isolated system of fluid pressure and control elements operated by the same.

Another object of the invention is to provide a system of propeller control that will effect a selected pitch setting, or change in pitch setting whether the setting requires an infinitesimally small pressure application or an application of some great magnitude, or some modification of either.

Another object of the invention is to provide a fluid pressure system with control elements for automatically supplying adequate pressure potential of power to the control passages whether a minute impulse is to be applied for a slight correction in governed pitch setting or whether a very forceful impulse is to be applied for an extremely large pitch change, such as shift from positive pitch to negative pitch, feathering or return to the operating range.

Another object of the invention is to provide a system of fluid pressure control for blade pitch setting that embraces governed positive pitch, negative pitch, feathering and return to the governed positive pitch range, wherein the various pitch settings will be accomplished efficiently and quickly in response to selective manipulation of a single manual control element.

A further object of the invention is to provide a fluid pressure supply system that provides a relatively low pressure supply or power for governed pitch settings but immediately steps up the potential of pressure or power supply to meet the needs of the apparatus for effecting greater pitch changes other than governed pitch.

Yet another object of the invention is to provide a fluid pressure supply system that immediately meets the wide range of pressure applications necessary to effect governed pitch and feathering or shift from the positive pitch range and return, but in turn impresses upon the control passages during needs for small or weak pressure impulses only such pressure potential as is needed to efficiently and quickly effect the lesser control.

These objects and advantages are accomplished by providing a closed fluid pressure system that is isolated, each with respect to its own structure to be controlled. A system pump and one or more additional pumps rotate with and are each driven whenever the propeller rotates with respect to its supporting structure, the system pump always feeding into the supply conduit of the system to supply fluid under pressure to all of the control elements of the system, and delivers such volume of fluid under pressure that there is always a surplus over what is needed for charging an accumulator and for effecting governed pitch settings, with perhaps a lesser surplus when shift is made from one governed pitch range to another governed pitch range. Pressure controlling means that are subject to the output of the system pump and influenced by the pressure impulses needed to effect any of the pitch adjustments operate to determine how much surplus of the system pump will obtain and returns it to the sump thereby fitting the pressure in the control lines to the needs for effecting the selected pitch change. Operating in conjunction with the last named means is a pump control valve that responds to the variable surplus from the system pump for connecting and disconnecting the additional pump or pumps to the system when the output of the system pump is inadequate to supply the needs of pressure applied for pitch change setting within the time interval desired.

Further objects and advantages of the present invention will be apparent from the following description, reference being had to the accompanying drawings wherein a preferred embodiment of the present invention is clearly shown.

With reference to the drawings, and first with respect to the fluid circuits schematically shown in Figs. 1 to 6, a system pump 1 is safeguarded by a check valve 2 as it empties into a pressure line 3 leading by a branch 4 to a range selector valve 10 connected by an extension tube 11 with the intake port 21 of a governor valve 20 which has control ports 22 and 23 connected by pipes 24 and 25 with a torque unit 30 adapted to shift the blade 31 in response to control by the governor 20 as will presently appear. The pressure line 3 has a branch 5 connecting it with a variable pressure control valve 40, and a branch 6 connecting it with an accumulator control valve 50 in turn connected by tube 7 with an accumulator 60, as will presently appear. The variable pressure control valve 40 has two other connections into the system that are variously controlled according to propeller operation, and include a tube 41 leading to a pump control valve 70 also connected by 71 to one or more auxiliary pumps 80, and by 72 to a check valve 90 connected by 91 back to the pressure line 3. The other of the variously controlled connections from the pressure control valve 40 includes a branch 42 leading to a shuttle valve 100 having input connections 101 and 102 from the control passages 25 and 32 extending between the governor 20 and torque unit 30.

With respect to the valve assemblies in the order of mention, the range selector valve 10 comprises a cylinder 12 with spaced ports 13, 14, 15, 16 and 17, controlled by a valve plunger 18 urged to a normal positive pitch selecting position by a spring 19. That positioning of the plunger 18 so disposes the lands $a$, $b$, $c$, of the valve that the ports 13 and 14 will normally connect the pressure line 3 with the intake of the governor valve through branch 4 and tube 11, and so that the pitch decrease pipe 24 is connected at 15 with 16 and thence by line 32 with the torque unit 30. The port 17 connected by 33 to the increase pitch pipe 25 is closed in this position of the range selector valve.

The governor valve 20 comprises a sleeve providing the ports 21, 22 and 23 and is adapted to slidably receive a valve plunger 26 pivotally connected to a lever 27 urged against a movable fulcrum 28 by a compression spring 29, the plunger 26 having lands $d$ and $e$ so spaced as to normally cover both of the control ports 22 and 23 when the valve is in equilibrium, which occurs when the rotating apparatus causes the valve member 26 to move radially outward (toward the top of the page in Figs. 1 to 6), to absorb the force of the spring 29. In this equilibrium position the flow from port 21 is arrested and there is substantially no flow from either of the ports 22 or 23. If the valve plunger for any reason moves outward from the equilibrium position, such as in an overspeed condition, as in Fig. 2, then port 21 is connected with increase pitch port 23 and the pressure line 3 is connected through pipe 25 with the torque unit chamber 34 while the chamber 35 on the opposite side of a piston 36 is connected by the line 32 with the ports 16 and 15 of the range selector valve 10 which establishes a drain connection through control passage 24 and port 22 of the governor 20. On the other hand, if the valve plunger for any reason moves inward from the equilibrium position, such as in an underspeed condition, then the port 21 is connected with the decrease pitch port 22, which by the passages 24 and 32 with their intervening and connecting ports 15, 16, connect the pressure line 3 with the chamber 35 of the torque unit. The chamber 34 in this instance has its drain connection by way of passage 25 and port 23. Applying pressure from the pressure line 3 to either side of the piston 36 of the torque unit and opening the other side to drain sets up such pressure differential in the torque unit that the piston plunger 37 connecting the piston 36 with the blade 31 through the rack 38 and gear 39 effects pitch shifting movement of the blade. Thus, when there is a controlling function being applied to the torque motor 30 there is need of a substantial pressure potential to meet the aggregate of mechanical resistances.

The variable pressure control valve 40 operates to step up the potential of pressure in the pressure line 3 to meet the needs for the particular controlling function called for. For that purpose the branch 5 from the pressure line 3 opens into a chamber 43 housing a headed plunger 44 and extending into a reduced bore 45 that opens laterally into the passages 41 and 42 so spaced that a land $f$ on the plunger 44 may isolate one from the other, a spring 46 acting normally to assist the effects of centrifugal force applied to the plunger to close a port 47 opening into the tube 41. However, pressure from the line 3 applied through the branch 5 is always present in the chamber 43 traversed by the head 48 of the headed plunger serving to damp movement of the plunger when changes of motivating forces are experienced. Thus the pressure is generally equal on both sides of the damping head 48, but it acts upon the annular area of the land $f$ within the bore 45 to oppose the forces exerted by the centrifugal force and the force of spring 46 upon the valve plunger so that the bore 45 is opened to the port 47 of tube 41 which in turn leads to the pump control valve 70 to escape to drain through an orifice 73. During onspeed operation, or when the governor valve is in the equilibrium position, there is little need for the pressure that is constantly being built up by the system pump 1, so that the force exerted on the end of the land $f$ moves the plunger to a position that the port 47 is partly opened to relieve the high pressure through 41 and 73.

thereby relieving the load upon the pump 1. Directly upon the occurrence of any control function, or upon the fall of pressure within the system that is below the required potential, the decrease of pressure is immediately felt in the branch 5 and the chamber 43. There is then a decrease of pressure applied to the end of land f and the combined spring and centrifugal forces acting to move the plunger 44 radially outward also closes the port 47 cutting off the drain from the system.

Figure 1:
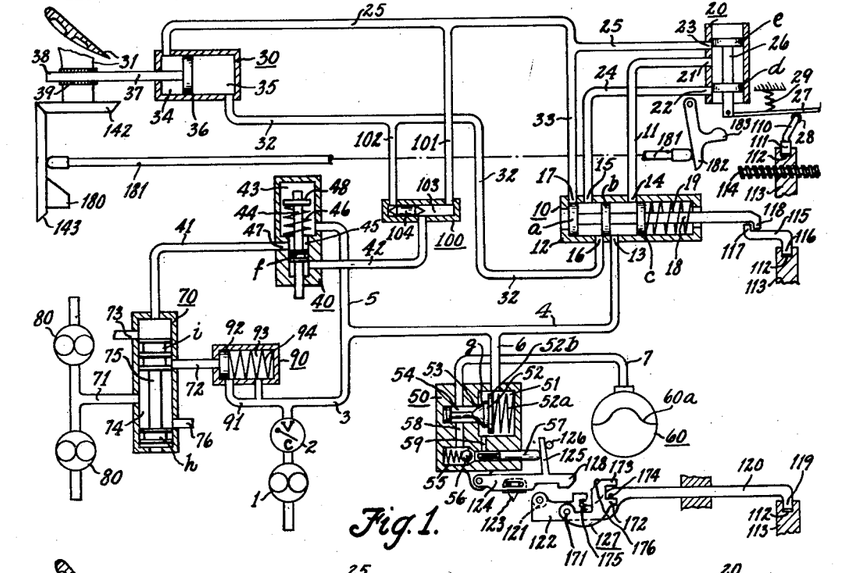
Fig. 1 is a fluid circuit diagram of the mechanism conditioned for take-off and for accumulator filling.
Figure 3:
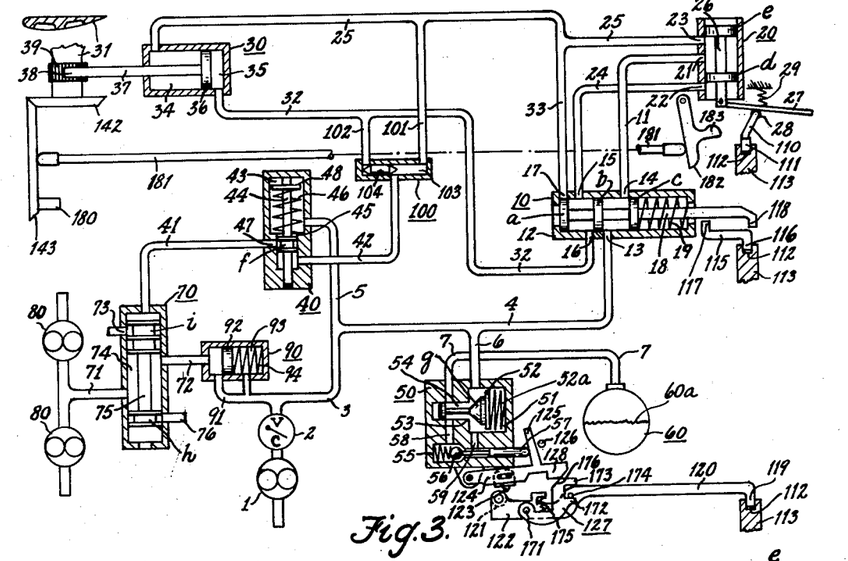
Fig. 3 similarly illustrates the fluid circuits during feathering of the blades.

One of the continuing needs for pressure within the system, especially during the early period of starting the propeller, is the conditioning of the accumulator 60 so that a reserve of pressure is always available for additional propeller control, and involves the accumulator control valve 50 that has a chamber 51 into which the branch 6 opens and which houses a flow valve 52 having a valve portion g spring urged to engage a seat 53 at the juncture of a reduced bore 54 from which connects the tube 7 leading to the accumulator 60. A valve bore 55 houses a spring pressed check valve 56 and a push rod 57 by which the check ball may be unseated; one end of the bore 55 opening into the reduced bore 54 at 58, while the bore at the opposite side of the check ball 56 opens into the chamber 51 by passage 59. Fluid pressure applied through the branch 6, as shown in Fig. 1, flows into the chamber 51 around the head of the flow valve 52 and thru the passage 59 to the smaller diameter of the valve bore unseating the valve 56 to flow thence through 58, 54 and 57 into the accumulator 60. That is a condition that obtains just so long as the pressure of the pressure line 3 is greater than the stored potential of the accumulator. Proper setting and calibration of the variable pressure control valve 40 and of the valves in the accumulator control valve 50 can provide assurance that there will always be a fully charged accumulator. The check valve 56 normally prevents return flow of pressure from the accumulator, even during an extended rest period. Actuation of the push rod 57 unseats the ball check valve 56, as shown in Fig. 3 which allows a surge of pressure under the influence of the accumulator, and which is always present in the bore 54, to flow through 58, 55, and 59 to the underside of the flow valve 52, which moves the valve against the urge of the spring 52a to a position on the other side of the opening to the branch 6. That movement of the valve 52 withdraws the valve portion g from the seat 53 and opens the accumulator directly to the branch 6 which then flows by way of 4, 13, 14 and 11 to the governor valve 20 to there be distributed in accordance with predetermined plans. As soon as flow is arrested the flow valve 52, because of equal pressure on both sides of the head, drifts back to seating engagement at g and 53 under the influence of the associated spring, and the reserve of pressure within the accumulator is saved for a subsequent operation of the push rod 57. Generally, only a momentary depression or actuation of the push rod is needed or required to effect the connection of the accumulator stored pressure with the pressure line 3, which then persists so long as the pressure within the accumulator is greater than the pressure within the pressure line 3 and its branches.

To augment the pressure within the pressure line 3 so that there will not result an exhausting demand on the accumulator for every additional control that is called for, the auxiliary pump or pumps 80 are cut into the pressure line when an exceptional demand of pressure potential is made and the propeller is still operating at or above a predetermined speed. The cut-in of the auxiliary pumps 80 is controlled by the pump control valve 70 under the influence of the variable pressure control valve 40 and as a result of the pressure demands made upon the system somewhat as shown in Figs. 3 to 6. The pump control valve 70 provides a chamber 74 that houses a valve plunger 75 fitted with a land h controlling a drain port 76, and a double land i for controlling the outlet orifice 73 and also an opening into the connection 72 leading to the check valve 90. The valve 70 is so disposed that centrifugal force acting upon the plunger 75 casts it radially outward (toward the top of the views) to close off the drain port 73 for the variable pressure control valve by the land i, and the drain 76 for the pumps 80, by the land h, and so as to connect the output of pumps 80 through 71 and 72 to the check valve 90. However, the pop-off from ports 47 of the variable pressure control valve 40 opposes that centrifugal force upon the valve plunger 75 at the end of the land i and tends to move the plunger inward to a position where the pop-off of the variable pressure control valve can exit through 41 and the end of the chamber 74 at 73. When the plunger 75 is at this inward or depressed position, then the outlet of the pumps 80 through the connection 71 to the bore of the valve is drained at 76, and the opening to the passage 72 for the check valve is closed.

Thus, when the pressure in the pressure line 3 becomes too low, that condition is sensed by the variable pressure control valve 40 by closing of the port 47 which allows the pump control valve 70 to connect the auxiliary pumps to the pressure line 3. The output of pressure from that source will displace the check valve element 92 within the chamber 93 of the valve against the spring 94 until the connection is made with an opening into the line 91 joining the pressure line 3. The cut-in of the auxiliary pumps is designedly made before the pressure within the line 3 becomes so low that a demand has to be made upon the stored potential of the accumulator 60. This is particularly effective while there is any substantial rotation of the propeller, since all of the pumps are mounted on the rotating propeller and are driven in response to propeller rotation by reason of a fixed gear giving them impetus from the outside. Thus, for the beginning of the feathering control, and for the shift into negative and back to positive pitch range, the pump supply for the system will be sufficient. During pitch shifts of great magnitude, even when passing from the positive range to the negative range and returning, the pump supply system is ample to supply the needs for pressure without resorting to the accumulator stored pressure which thereby may be saved for the feathering and unfeathering functions only.

Assurance is made that the auxiliary pumps will be cut-in before the potential of the system is too greatly depleted, by means of the shuttle valve 100 and its connections to the variable pressure control valve and to the control passages for the torque unit. The shuttle valve 100 comprises a closed chamber 103 housing a valve element 104 capable of movement lengthwise thereof in response to fluid pressure applied at either end thereof and of the chamber 103. Passage 101 branching off from the increase pitch line 25 connects at one end of the chamber 103 and passage 102 branching off from 32 for the decrease pitch line, connects at the other end of the chamber 103, while the pipe 42 connects at the middle of the chamber and opens into a chamber 45 at the end of the land *f* of the variable pressure control valve 40. That connection provides the variable pressure function of the pressure control valve 40, since the effect of centrifugal force and spring force tending to close the blow-off port 47 is assisted by the pressure in the chamber 45 regardless of the direction that the piston of the torque unit is moved. If a controlling function is directed by the governor 20 through the increase pitch port 23 and control passage 25, the pressure therein will also follow 101 to the shuttle valve 100 and move the valve element 104 so that the pressure in 101 can follow the passage 42 to the chamber 45. On the other hand, if a control function is directed by the governor through the decrease pitch ports 22 and 24, 15, 16, 32, that pressure will also follow 102 to the shuttle valve 100, move the valve element 104 and flow through the passage 42 to the chamber 45. Pressure applied to the chamber 45 at least temporarily urges the land *f* toward closing position with respect to the port 47. If the increased pressure demand is small, the mere closing of the pop-off ports 47 may be sufficient to provide all of the increased pressure potential that is required since all of the delivery from the system pump 1 is now available to perform the function called for. On pressure demands of greater magnitude, the pop-off ports 47 remaining closed are augmented by lack of drain through 41 and 73 of the pump control valve 70, which permit the plunger 75 to move outward (toward the top of the sheet) for connecting the pumps 80 with the check valve 90. There being no discharge from the pop-off ports 47 there is no flow against the end face of land *i* in opposition to centrifugal force on the plunger 75, which plunger now drifts outward to close the drains 73 and 76 and connect 71 with 72. As soon as the control function is completed, or as soon as the control ports 22 and 23 are closed the pressure within chamber 45 is reduced and the now high pressure in the chamber 43 acts on the face of land *f* to retract the valve to open the pop-off ports 47 and then flow through 41 against the end face of land *i* to move that plunger 75 inward which disconnects the pumps 80 from the line and opens the two drain ports 73 and 76.

Figure 4:
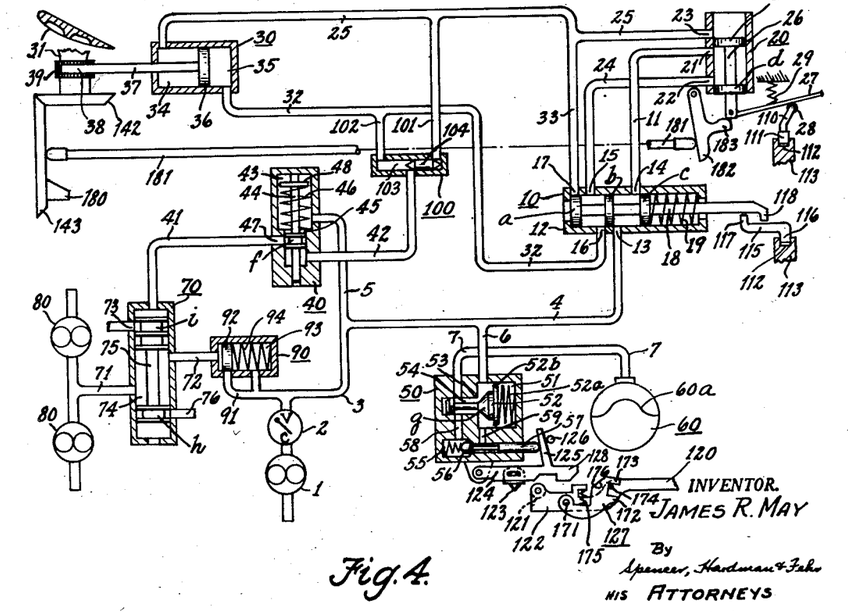
Fig. 4 illustrates the conditions of the system for unfeathering.
Figure 5:
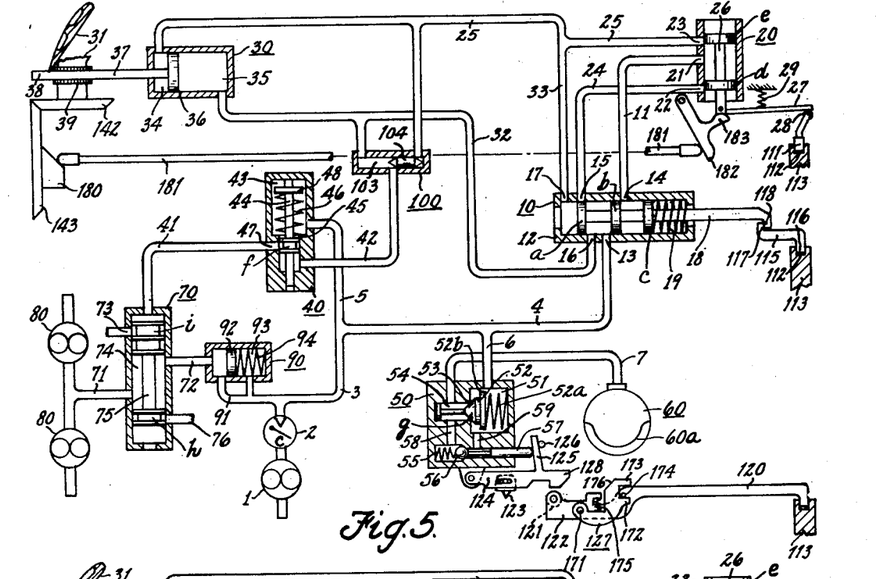
Fig. 5 shows the transition from the positive pitch range to the negative pitch range.
Figure 6:
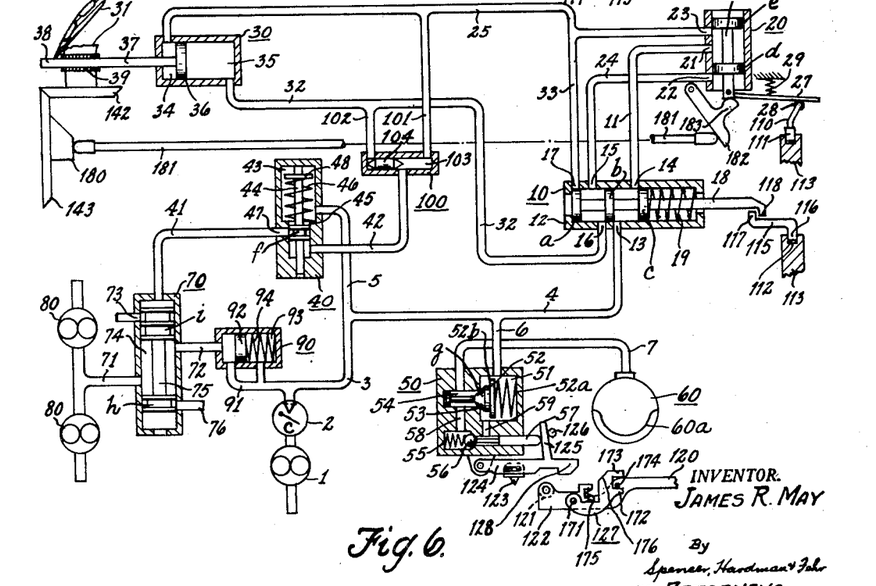
Fig. 6 illustrates the transition from negative pitch range to the positive pitch range.

Those features apply variously to any of the conditions experienced in flying and generally illustrated in the fluid circuits of Figs. 1 to 6, whether the flying condition be for take-off, cruising on governed speed, feathering and unfeathering, reverse pitch for braking, or shifting back to positive pitch. Selection of those and other flying conditions is accomplished in general by movement of the fulcrum member 28 which alters the opposing relation and ratio of forces administered to the valve lever 27 by the centrifugal force of propeller rotation and by the spring 29. A carriage 110 supports the fulcrum 28 and has a part 111 running in a groove 112 of a control ring 113 movable lengthwise of the lever 27 by means of threaded shafts 114 actuated by an outside force as will presently appear. Also engaging the same groove 112 there is a shoe 116 extending from a member 115 that carries a pin or abutment 117 engageable with a cooperating abutment 118 on the end of the stem 18 for the range selector valve 10. A third shoe 119 engages the groove 112 and operates to shift a rod or the like 120 to actuate linkage for control of the valve unit 50 guarding the accumulator 60. That linkage includes a roller 121 on a carriage 122 movable by the rod 120, the roller 121 being characterized such as to engage a movable cam member 123 on a pivoted lever 124 having a part 125 normally resting against a stop 126 but adapted to actuate the push rod 57 for upsetting the ball check valve 56. A speed responsive member 127 on the carriage 122 is adapted under certain conditions, as will later appear, to engage an extension 128 of the lever 124 for holding the push rod 57 depressed. Due to the character and dimensions of the structure, the carriages 110, 115 and 122 are moved whenever the control ring 113 is moved, and under certain conditions, such as near the one end of control ring movement the valve plunger 118 is also moved. Thus when the fulcrum 28 is moved along the lever to the position for feathering illustrated in Fig. 3, the carriage 122 is also moved to trip the valve 56. Likewise when the fulcrum 28 is moved out of the feathering position to the unfeathering position of Fig. 4, the carriage 122 actuates the valve 56, but when the fulcrum 28 is moved to the reverse pitch position or returned to the governed positive pitch range there is no operation set up by the carriage 122 though it is moved at the same time. The selector valve 10 is moved only when the fulcrum 28 is moved into the reverse pitch position and back to the positive pitch range, such as is shown in Figs. 5 and 6.

Figure 7:
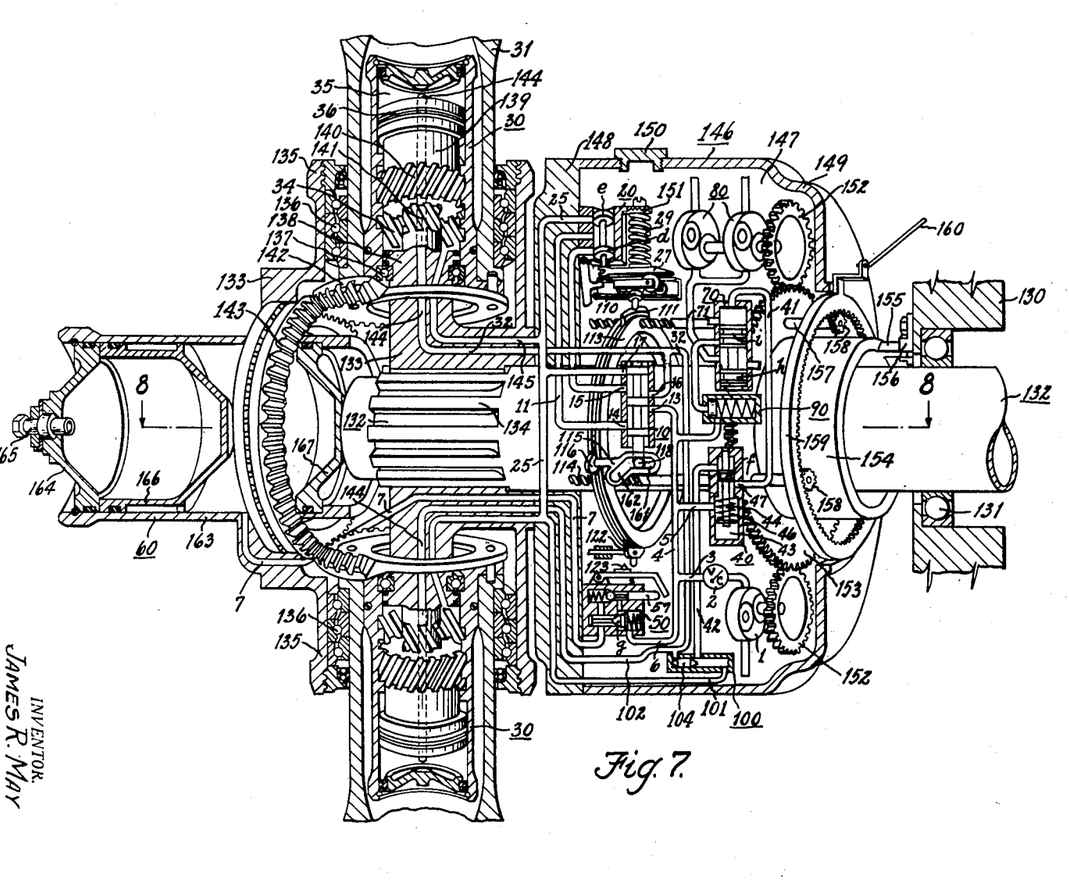
Fig. 7 is a schematic view in section showing the fluid circuit of Figs. 1 to 6 applied to a rotating structure of the nature of a constant speed propeller.

The schematic view of Fig. 7, shows graphically an adaptation of the fluid circuit as applied to a rotating self contained propeller mechanism of the character described and claimed in the U. S. patents to Blanchard et al. 2,307,101 and 2. The reference 130 indicates a portion of the engine nosing or gear casing or other part of an aircraft providing a bearing 131 for support of a propeller shaft 132 which is drivingly connected with a propeller hub 133 by splines or the like 134. The hub 133 provides a plurality of sockets 135 rotatably supporting the blades 31 on stack bearings 136 and a pilot bearing 137 supported by a spindle 138 concentric with the bottom of the socket. Housed within the blade root 31 there is the torque unit 30 including the piston 36 separating the chambers 34 and 35, the piston having a skirt 139 helically splined to the cylinder at 140 and to the spindle 138 at 141, such that radial movement of the piston causes the blade 31 to rotate within the socket 135, to which blade is attached a blade gear 142 that meshes with a master gear 143 that maintains equalized turning of all of the blades of the hub. Extending along the center of spindle 138 there is a tubular passage 144 connecting the chamber 35 with the control passage 32, while a passage 145 connects the chamber 34 with the control passage 25 and thence to the governor valve 20 and the selector valve 10 as has been explained above.

Attached to the propeller hub 133 there is a regulator 146 that encloses all of the control elements and rotates with the propeller so as to form a reservoir 147 providing the fluid medium by which the apparatus operates. The regulator comprises a plate 148 embedding certain of the tubes and passages for the fluid circuit, and forming a mounting support for the control elements, the proper mounting of the elements also effecting their proper connection into the fluid circuit. A cover member 149 secured to the plate 148 completes the enclosure of the reservoir except for certain seals, as will presently be described, and provides a filler opening closed by a screw plug 150 that is so disposed as to provide for ground adjustment of the governor valve 20, a movable abutment 151 being provided for seating the spring 29. While all of the control elements are structurally mounted on the plate 148, they are not so illustrated in the schematic view of Fig. 7, which is thought to make for better clearness.

All of the pumps 1, 80, and 80 are mounted on some part of the regulator so as to rotate as the propeller is rotated and are thereby driven by reason of the pump driving gears 152 rolling about a toothed flange 153 carried by an adapter sleeve 154 concentrically circumscribing the shaft 132, and extending outside of the regulator cover 149 to provide a lug or tongue 155 engageable between brackets or stops 156 carried by a rigid part of the craft, such as the gear casing 130. Thus, during operation of the propeller, the hub and regulator rotates relative to the adapter sleeve 154 and the engine nosing 130. Journalled in the flange 153 of the adapter sleeve there are a plurality of shafts 157 each of which ends in the threaded shafts 114 for moving the control ring 113, and each shaft 157 is headed up by a pinion 158 engageable with the teeth of a ring gear 159 outside of the regulator, and which is oscillatable by means of a cable or rod connection 160 accessible to the pilot, or operable by some automatic speed control device. It should be apparent that oscillation of the ring gear 159 will coincidentally rotate all of the shafts 157 and thereby shift the control ring one way or another along the shaft 132. As the control ring is shifted, it will necessarily actuate the elements 110, 116 and 122 to effect the control functions heretofore described. Some slight modification is here shown as to the mechanical linkage by which the several valve actuations are accomplished, but they are functionally the same. The member 115 is here shown as having a slotted link of two branches 161, and 162 cooperating with the pin or abutment 118, and so characterized that traverse of the branch 161 has no effect upon the position of the selector valve 10 but that traverse of the branch 162 when the control ring is being moved to set the governor fulcrum 28 for negative pitch will at the same time shift the selector valve to the negative pitch position. The accumulator 60 is also shown as of the rigid flask type mounted at the forward end of the hub and shaft, to include a cylinder 163 mounted on the hub and closed at its out end by a removable cap or plug 164 carrying a filler valve assembly 165 by which the interior of the cylinder may be charged with gas under pressure. A cup-like piston 166 is slidably disposed within the cylinder 163. The opposite end of the cylinder 163 is closed by a head member 167 and thereby forms a chamber opening to the passage 7 as has been explained.

Upon comparison of Figs. 1 to 7 it should be apparent that movement of the rod 160 and ring gear 159 will shift the carriage 110 along the length of the lever 27 so that the various functions of control can be set up. The conditions for engine starting will be somewhat as indicated by the fluid circut connections illustrated in Fig. 1, except that the accumulator filling valve 56 will be closed so as to conserve the stored energy in the accumulator, and the shuttle valve 100 may have its shiftable element at either end of the casing depending upon the last pitch shifting function that was applied to the torque unit. The governor valve 26, since the propeller is not rotating, will take up a radially inward position as in Fig. 4, in which the spring 29 causes the lands d and e to uncover the ports 22 and 23. The pumps not rotating, there will be but trapped pressure in the lines 3, 4, 5, and so the plunger 44 of the pressure control valve raises under the influence of spring 46 closing the port 47. There being no blow-off pressure in line 41 to the pump control valve 70 its plunger may be in the pump connecting position shown if the pressure in the source line had been low at the time of propeller stopping, or it may have drifted to pump disconnecting position if the line pressure had been sufficiently high to supply the needs at the time of propeller stop. Start of the engine and rotation of the propeller drives the pumps 1 and 80, to build up pressure in the line 3, 4, 5 leading by way of ports 13 and 14 and passage 11 to the port 21 of the governor valve 20. Since the port 22 is now uncovered, pressure flows through 24, 32 to the chamber 35 of the torque unit and actuates the piston 36 in a decrease pitch sense. Speed of propeller rotation soon mounts to such value that the governor valve member 26 reaches the equilibrium position for the particular setting of the fulcrum 28 and the engine and propeller run at idle speeds which is proper for warm-up. During this period the valve units 40, 50, 70, 90, and 100 will have operated to meet the conditions of need, with proper cut-out of auxiliary pressure source as the pressure in the line rises beyond the needs of pitch shift, and perhaps some attendant charging of the accumulator. Under engine idling conditions, the elements of control will rapidly reach a substantially stable relation in which the governor valve lands d and e cover the ports 22 and 23 with the blades 31 remaining at a setting fitting the torque applied by the engine. There being practically no demand for fluid flow to effect pitch change the pressure control valve 40 will open port 47 which feeds pressure fluid against the end of plunger 75 to open ports 73 and 76, disconnecting the delivery of pumps 80 from the line 3, and relieving the excess of the lines 3, 4, 5 to the reservoir. If the delivery of pump 1 is more than is needed the excess spills out to the reservoir by the valve 70 and drain 73.

*Takeoff and accumulator filling*

During take-off the fulcrum 28 is moved to the proper R. P. M. setting and the engine fuel delivery is increased, the propeller control elements then assuming the relation somewhat in semblance to the illustration of Fig. 1. The range selector valve 10 remains in the positive pitch position with the parts 117 and 118 out of engagement substantially as shown. The increased speed of the engine rotates the regulator faster and the centrifugal force acting on the governor valve 26 moves the lands d and e outward to uncover ports 22 and 23 which connects the pressure source from lines 3 and 4 through the ports 21, 23 with chamber 34 of the torque unit, the chamber 35 draining back to the reservoir through 32, 16, 15, 24, and 22. Pressure in the control passage 25 tends to increase the pitch of blade 31 to match the engine torque, and is applicable through the branch 101 to one end of the shuttle valve 100 which shifts to apply that high pressure to the chamber 45 of the pressure control valve which tends to assist the spring and centrifugal force upon the plunger 44 to close the blow-off port 47. Normally the pressure in the lines 3, 4, supplied by the pump 1 will be enough to answer all demands for this condition of operation, wherefor valves 40, 70 and 90 remain in the condition shown. In fact there may be such excess of pressure developed that the charge of the accumulator may continue, if it has not been completed during the engine idling conditions. Referring to the valve unit 50 of Fig. 1, it should be understood that accumulator filling takes place whenever the pressure potential on the pump side of the ball check valve 56, that is in the chamber 51 and passage 59, is greater than the aggregate of spring pressure and accumulator pressure in the passages 54, 58 and 55 on the other side of the ball check valve. In any event during accumulator charge, pressure forces the fluid from the line 4 through the passage 6 into the chamber 51 where it flows around the head 52 of the flow valve and through the passage 59 to unseat the ball check valve 56. From the chamber 55 the fluid flows by way of 58, 54 and 7 to the interior of the accumulator 60 deflecting the resilient wall 60a. Obviously, when the pressure differential on opposite sides of the ball check valve has been reduced, the charging of the accumulator will cease. Should the pressure differential across the ball check valve be reversed, there will be no back flow from the accumulator except as controlled and later described. The high accumulator pressure in the bore 54 is applied to equal areas and in opposite directions, when the valve g is closed against seat 53, becoming a balanced valve. However, the spring 52a assures closing of the land g against the seat 53 until it is intentionally displaced, such as for feathering or unfeathering.

Overspeed control

Figure 2:
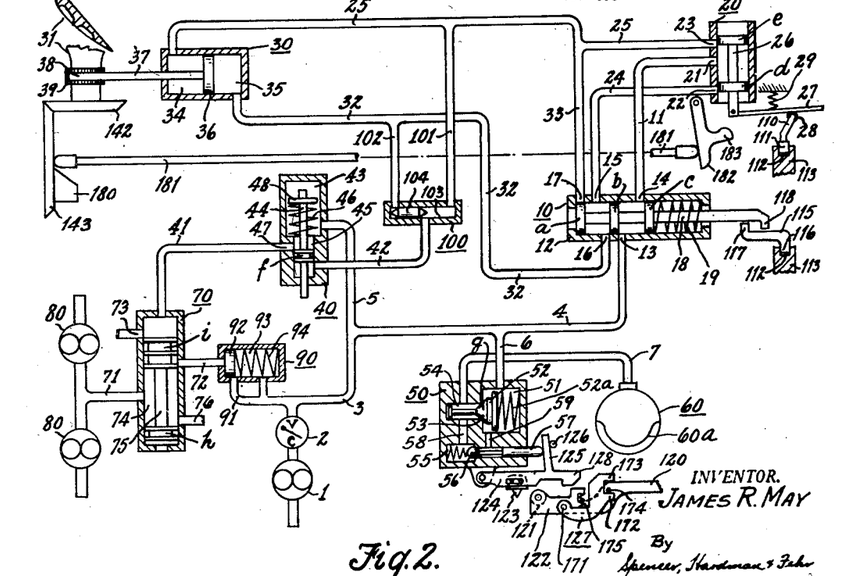
Fig. 2 is a similar fluid circuit diagram for the apparatus while operating during level flight or cruise, but with the control under a condition of overspeed.

Normally, at the conclusion of take-off, the craft will be leveled off for cruising under constant speed, which is accomplished by moving the control cable or rod 160 to effect the most efficient engine and propeller operation, by shifting the fulcrum 28 to best suit the engine and propeller combination. As shown in Fig. 2 that involves a slight increase of blade pitch which is accomplished by moving the fulcrum to the left of the take-off setting which is toward the spring 29. Little change will take place in the relation of the control elements, beyond a momentary outward movement of the governor valve 26 due to the shift of the fulcrum giving the centrifugal force temporary domination over the spring force upon the valve 26. This outward movement of the valve 26 connects port 21 with 23 for pressure application to the increased pitch line to the chamber 34 of the torque unit, the chamber 35 draining back through port 22. The pitch of the blades 31 is accordingly increased to the point where the increased load on the engine decreases its speed until the forces acting in opposition of the valve 26 bring it back to the equilibrium position in which the lands d and e substantially cover the ports 22 and 23 with no further blade shift. In the event of any change of speed, the governor valve moves to effect the proper change in blade pitch to suit the speed change. If there is a decrease of speed, then there is less centrifugal force applied to the valve 26 and it moves radially inward to connect port 21 with 22 and apply pressure to the pitch decreasing side of the torque unit. If there is an increase in speed, then there is more centrifugal force applied to the valve 26 which moves it outward to connect port 21 with 23 as shown in Fig. 2. That shift of the valve 26 directs pressure to the pitch increase side of the torque unit. In each case, as soon as the blades are shifted to meet the new change in speed, the governor valve returns to cover the ports 22 and 23, or the equilibrium position.

Feathering control

Whenever during flight an engine becomes inoperative or is to be rendered inoperative, it is desirable to turn the blades so that they will offer the least resistance to the air stream and not be rotated. The feathering adjustment is accomplished by actuating the cable or rod 160 to move the fulcrum 28 to a position between the spring 29 and the valve plunger 26 substantially as shown in Fig. 3. That movement so alters the forces acting on the valve plunger 26 that centrifugal force assists the force of spring 29 in moving the plunger 26 outward for widely connecting the ports 21 and 23. That fulcrum movement does not alter the position of the selector valve 10 but it does move the carriage 122 far enough toward the left of the view that the roller 121 engages the cam 123 and actuates the lever 124 to depress the pin 57 for upsetting the ball check valve 56. The extreme outward movement of the valve 26 conditions the pitch shifting lines for pressure application from line 4 to the increase pitch side of the torque unit, and the opening of the check valve 56 applies the pressure within the accumulator to the line 4.

If the propeller is not rotating at the time the feathering function is called for, or if the propeller is rotating but slowly, then a momentary opening of the check valve is all that is required for applying the accumulator pressure to the blade torque unit. However, if the propeller is rotating rapidly, then the pressure within the lines 4 and 6 may be so high as to be near the potential of the accumulator pressure. Thus, the pressure on opposite sides of the flanged head of the flow valve 52 may be so nearly equal that opening of the ball check valve does not properly open the valve g. That is desirably the condition, so that the stored accumulator pressure may be saved for blade movements when there is nothing to augment the accumulator pressure. When the governor valve is first opened widely for connecting the ports 21 and 23 there is such sudden depletion of pressure in the lines 4, 5 and chamber 43, accompanied by flow from control passage 25 through 101, 103, and 42 to chamber 45 that the pressure control valve 40 immediately closes the blow-off port 47 which effects cut-in of the pumps 80 to supplement the pump 1. For that reason the pressure in line 4 is maintained so long as the propeller is rotating at a sufficient speed, and the pressure in chamber 51 remains high until the feathering function is well toward completion.

Feathering is an increase pitch function, and a coarse pitch setting with no driving torque applied rapidly slows down the speed of propeller rotation and consequently the delivery of the pumps 1, and 80. The condition is eventually reached in which there is sufficient pressure differential on the flanged head of the flow valve that the port 55 can be opened in response to unseating the ball check valve 56. Speed responsive means are therefor provided for holding the check valve 56 open during the interim between initial upsetting of it by the oscillation of lever 125 and the time that the pump pressure in line 4, and line 6 falls substantially below the pressure of the accumulator in 59 and that part of the chamber 51 to the left of the flanged head of the flow valve. That speed responsive means comprises a weight member 127 pivoted to the carriage 122 at 171 and has a notch bounded by parallel arms 172 and 173 engageable with a pin 174 set in the carriage 122 for limiting the pivotal movement of the weight member with respect to the carriage 122. A spring 175 seated on the carriage urges the weight member inward so that the arm 173 engages the pin 174 as shown in Fig. 4, but during propeller rotation the weight member moves outward under centrifugal force until the arm 172 engages the pin 174 as shown in Fig. 3. In that position, a cam portion 176 of the weight member 127 engages an extension 128 of the member 124 when the carriage is shifted to the feathering position and holds the lever 124 in the elevated position and the pin 57 in upsetting relation with respect to the ball check valve 56. Thus, during that interim of propeller rotation when the pumps are supplying pressure to the lines 4 and 6, the ball check valve is held open so that the flow valve 52 may be actuated as soon as the pump pressure falls sufficiently. There is thus an uninterrupted flow of pressure to the torque units for shifting the blades to the feathered position.

In any event, when there is flow from the accumulator to the pressure line feeding the governor valve, it is in the first instance by way of passage 7 to the bore 54 and thence through 58 to the bore 55 and beneath the unseated ball check valve 56 to the left hand end of the chamber 51 through the pasage 59, following the path in reverse shown in Fig. 1. The flow valve 52 has a flanged head 52b considerably larger than the area of the reduced bore 54 but materially less in diameter than the chamber 51 and such as to offer some restriction to free flow from one side of the head 52b to the other. Thus, when the accumulator pressure is applied to the left hand side of the flanged head and there is materially less force (pump pressure and force of spring 52a) on the right hand side of the flanged head 52b the flow valve will be moved to the right as shown in Fig. 3, to connect the accumulator directly to the pressure line through 7, 54, 53, 51, and 6, the movement of fluid keeping the land g away from the seat 53 until the torque units have effected the completion of the feathered shift. As soon as the blades reach the feathered position the pressure becomes equal on both sides of the flanged head 52b and the valve drifts back to a seating relation, while the weight member 127 because of no rotation of the propeller, has retracted against the stop 174 and the linkage for upsetting the ball check valve retracts allowing the valve 56 to again seat, thus trapping the remainder of accumulator pressure for the unfeathering function. During this portion of feathering in which the accumulator is supplying pressure to the line 4, the delivery from the pumps 80 is so low that the check valve 92 closes, and the pressures in passages 5 and 42 being equal the forces on opposite sides of the land f of the pressure control valve 40 balance except for the force of spring 46 which manifests in the closing of blow-off port 47, these means cutting off all unnecessary escape of accumulator pressure and insuring that it is directed along the proper passages to the torque units.

Unfeathering

To restore the blade pitch to operative governed pitch range by unfeathering, is accomplished according to the showing of Fig. 4, where the fulcrum 28 if moved along the lever 27 to a position at the right of the line of pressure of the spring 29. When that is done the propeller usually is not rotating and consequently there is no centrifugal force applied to any of the control elements. The governor valve 26 remains in the inward position shown where the port 21 is connected with the port 22 for directing fluid pressure to the pitch decrease chamber 35 of the torque unit, while the chamber 34 of the torque unit is open to drain at port 23. No change takes place in the range selector valve 10, but the carriage 122 in moving to the right does momentarily trip the lever 124 and effect unseating of the ball check valve 56 which effects opening of the flow valve 52 and connects the accumulator directly with the pressure line 4 as has been explained in connection with the feathering function. That pressure now flows through the passages 6, 4, 11, 21, 22, 24 and 32 to the chamber 35 thereby shifting the blade out of the feathered position into a windmilling position, or to such a position that the airflow over the propeller if the craft is in flight, that the propeller and engine will be rotated. Any rotation of the propeller drives the pumps 1 and 80, and their output eventually is delivered to the line 4 as has already been explained. The shuttle valve 100 has already been actuated by the initial application of accumulator pressure to the decrease pitch line 32 so that the blow-off port 47 is closed and the pump control valve 70 connects the pumps 80 to the line 3. When the delivery from the pumps reaches a value equal to the decreasing potential from the accumulator the flow valve 52 closes under the urge of spring 52a, and the unfeathering function is completed by the pumps under the rotating influence of the rotating propeller.

Transition positive to negative pitch

Under certain conditions of propeller operation it is desirable to have a negative pitch setting of the blades so that braking of the craft may be had on landing, or other maneuvering may be effected. Fig. 5 shows the condition of the control elements for the transition from positive governed pitch range to the ungoverned negative pitch setting. The fulcrum 28 has been moved to the extreme right hand end of the lever 27 by the control ring 113 which at the same time engages the elements 117 and 118 of the range selector valve linkage and moves the plunger 18 to the negative pitch position which switches the governor valve unit 20 out of the operative fluid circuit and connects the pressure line 4 directly with the chamber 35 of the torque unit 30, and the piston 36 moving in response thereto rotates the blade from the minimum pitch angle in the positive range through the zero pitch position to the maximum negative pitch angle. The drain from the chamber 34 of the torque unit is accomplished through passage 25, 33 and port 17 of the selector valves since the governor port 23 normally serving that purpose is now closed. That is because the increase of propeller speed occuring while the blade moves to zero inclination is enough to cast the valve 26 outwardly to connect port 23 with 21 which is now stopped at the other end of 11 with no outlet from the bore of the selector valve casing 12.

The blades 31 in rotating toward the negative pitch position each rotate their blade gears 142 which in turn drive a master gear 143 that carries a cam or riser 180 that engages a spring urged push rod 181 engageable with a movable piston stop 182 pivoted to or near the governor valve 20, which stop has an arm 183 engageable with the valve 26 for moving it to the pitch increasing position preparatory for the return shift to positive pitch. The start of that piston movement is shown in Fig. 5, and its fully shifted position in Fig. 6. When the transition from positive to negative is started the pressure line 4 is connected to the passage 32 without material restriction which would rapidly decrease the pressure for operating the torque unit were it not for the fact that the same pressure is applied to the shuttle valve 100 and to the chamber 45 of the pressure control valve 40 which closes off the blow-off ports 47 and cuts in the auxiliary pumps 80 to supplement the demand of fluid pressure needed for the complete shift. The blade angle being reduced as the shift is made toward zero pitch, an accompanying increase of propeller speed drives the pumps faster and should there be developed more pressure than is needded, the excess will either feed into the accumulator or be returned to the reservoir by the valve units 40 and 70.

*Transition from negative to governed positive pitch range*

Return to the positive pitch range is accomplished by shifting the fulcrum 28 along the lever 27 as suggested in Fig. 6, but this has no effect upon the governor valve 26 immediately inasmuch as it is held in the outward position connecting ports 21 and 23 by reason of the negative pitch position then occupied by the blades. The movement of the fulcrum 28 does shift the selector valve plunger 18 back to the positive pitch position which reestablishes the fluid connections proper for governed control by the operation of the governor as soon as the positive pitch range is accomplished. As soon as the shift of the selector valve is made to the positive pitch position, pressure in the line 4 flows through 13, 14, 11, 21, 23, 25 to the chamber 34 of the torque unit. There is substantially no restriction at ports 21, 23, and the shift now being made through angles that are at first decreasing, the pressure of the system is automatically supplemented by the auxiliary pumps as needed. At first the arm 183 holds the valve 26 in the increased pitch position until the cam 180 withdraws from the end of rod 181, and then the increased speed tends to keep the governor ports 21, 23 connected until blade shift into the positive pitch range has progressed far enough and increased enough in inclination to reduce the speed of propeller rotation. By that time the master gear 143 will have reversed its rotation far enough to have allowed the push rod 181 to retract and the piston stop 182 assume its normal position. The system will then be reconditioned for operation for any of the other functions, but particularly for take-off or cruise per the circuit conditions of Figs. 1 and 2.

Structural application of the foregoing principles will now be made with respect to Figs. 8 and those following where the same reference characters are applied so far as consistent, with further explanation as to differences of the physical structure. The engine driven propeller shaft 132 that projects through the engine nosing 130 provides a collar 190 against which seats a rear cone seat or ring 191 engageable with a complementary portion of a tubular extension 192 extending rearward from the hub 133 supporting the sockets 135. In front of the driving splines 134 the hub provides a seat cooperable with a split cone ring 193 forced into binding engagement by the usual hub-shaft nut 194 threaded on the end of the shaft 132 which disposes it somewhat remotely from the foreward end of the hub and makes way for the mounting of the accumulator chamber 163 by its flange 195 while a portion thereof including the head member 167 is socketed within the axial bore 196 of the hub in front of the shaft 132. Tightly fitting within the axial bore 196 and surrounding the nut 194 there is an endless cylindrical ring 197 covering a pair of internal grooves 198 and 199 of T-section that in their shallow parts contain each a pair of fluid seal rings 200 separated by a wave spring so that the middle portion of the T-groove may contribute to the fluid circuit as will presently appear. The ring 197 is secured against displacement by the cone ring 193 at one end and a snap ring 201 engaging a groove in the axial bore 196 at the other end. The stem portion of the T-groove 198 opens into a chamber 202 concentric of the central boss 203 for each socket 135 of the hub, and a cap screw 204 supporting a transfer tube 205 provides fluid connection to the outside end of the piston 36 which it slidably engages. The cap screw 204 in threading into the hub boss 203 also forces a dished member 206 into engagement with the inner flange 207 of a fixed spline member 138 that provides the spline connection 141 with the skirt 139 of the piston 36, and the fixed spline 208 has toothed engagement at 209, in the nature of splines, with the inner periphery of a cylindrical flange 210 upstanding from the hub boss 203, which assists in selecting and setting one of the limits of blade angle shift.

The piston 36 has a centrally disposed hollow stem 211 supporting a seal gland 212 slidably engaging the tube 205 in fluid tight relation thereby dividing the torque cylinder 30 into the two chambers 34 and 35 as has been described. The chamber 35 communicates with the tube 205 and internal groove 198 while the chamber 34 within the spline 138 opens through a notch or hole in the member 206 to a passage 213 in the hub boss 203 to the internal groove 199. About a portion 214 of the stem 211 there are disposed a number of shims 215 of such diameter as to overlay the end of the fixed spline member 138 and act as stops to define the minimum content of the chamber 34, or for limiting the inward travel of the piston 36 and thus one end limit of the range of blade shift. The shims are held in their relative position by a snap ring 216.

The torque cylinder 30 ends inwardly with a flange 217 engaging one element of a preload bearing 137 piloted about the hub boss 203, and several driving dowels, one of which is shown at 219, pin the flange 217 to the butt end 220 of the blade 31. At the appropritae sector the flange 217 provides the blade gear 142 meshing with the master or coordinating gear 143 which assures that all blades of each hub will be changed equally. The master gear as shown in Fig. 8 provides a sleeved extension 221 forming a race for a set of balls 222 contained by a stepped ring 223 filling the end of the hub 133 and providing a support for the master gear 143. The ring 223 is secured to the end of the hub in any convenient manner, usch as by cap screws through a plane flange bounded by a cylindrical flange 224 receiving a spacer 225 against which fits a flange 226 of a sleeve piloted within the hub and master gear as shown. Radially inward of the spacer 225 there is a ring 227 keyed to be driven by the extension 221 of the master gear 143, as by the ring and key device 228, the ring 227 providing the cam 180 designed for operating the rod 181 which here has a contact piece 229 engageable by the cam 180 and movable against a spring 230 encompassing the rod 181 and recessed in the hub 133.

Figures 8, 11, 15:
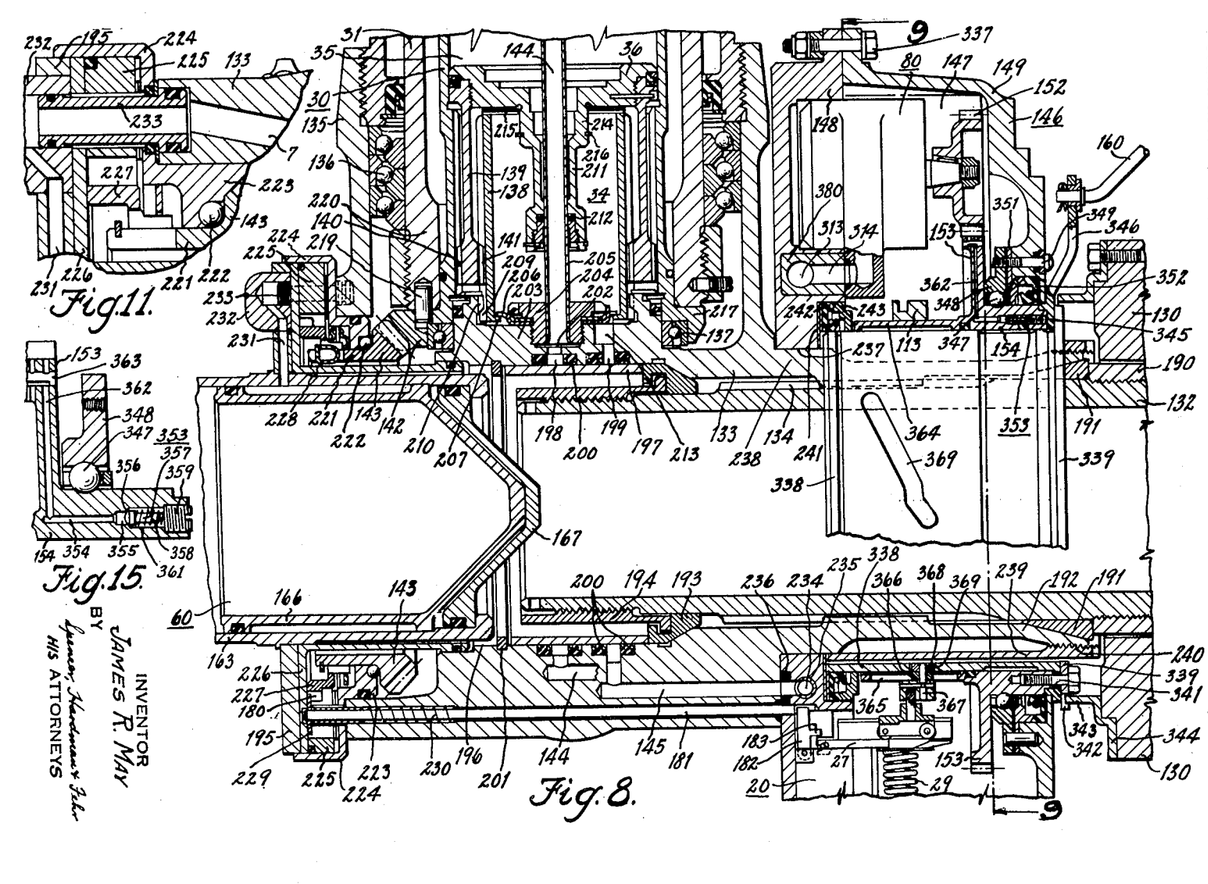
Fig. 8 is a sectional view in longitudinal section of a physical embodiment of the invention, it being a view suggested by the line 8—8 of Figs. 7, 9 and 10.
Fig. 11 is a detail in section by which certain of the fluid connections are made to and from the accumulator or pressure storing device.
Fig. 15 is a sectional detail of an adapter bearing and regulator vent, it being an enlargement of that shown in Fig. 8.

The flange 195 of the accumulator is mounted against the flange 226 and has a radially extending passage 231 leading from the cylinder 163 to a cap member 232, chambered to receive a tubular member 233 extending in sealing relation through the members 226, 225, 223 and to open into the passage 7 provided by the hub body, substantially as shown in Fig. 11. The passage 7 extends through the hub and opens to appropriate connections in the regulator, in a manner similar to that shown in Fig. 8 for the torque unit connections through the tubes or passages 144, 145 where the plate 148 has openings 234 from the embedded tubular members 235 aligned with the hub passage to be connected, there being a countersink in one of the members receptive of a resilient seal ring 236 that prevents leakage at the juncture.

Figures 9, 14:
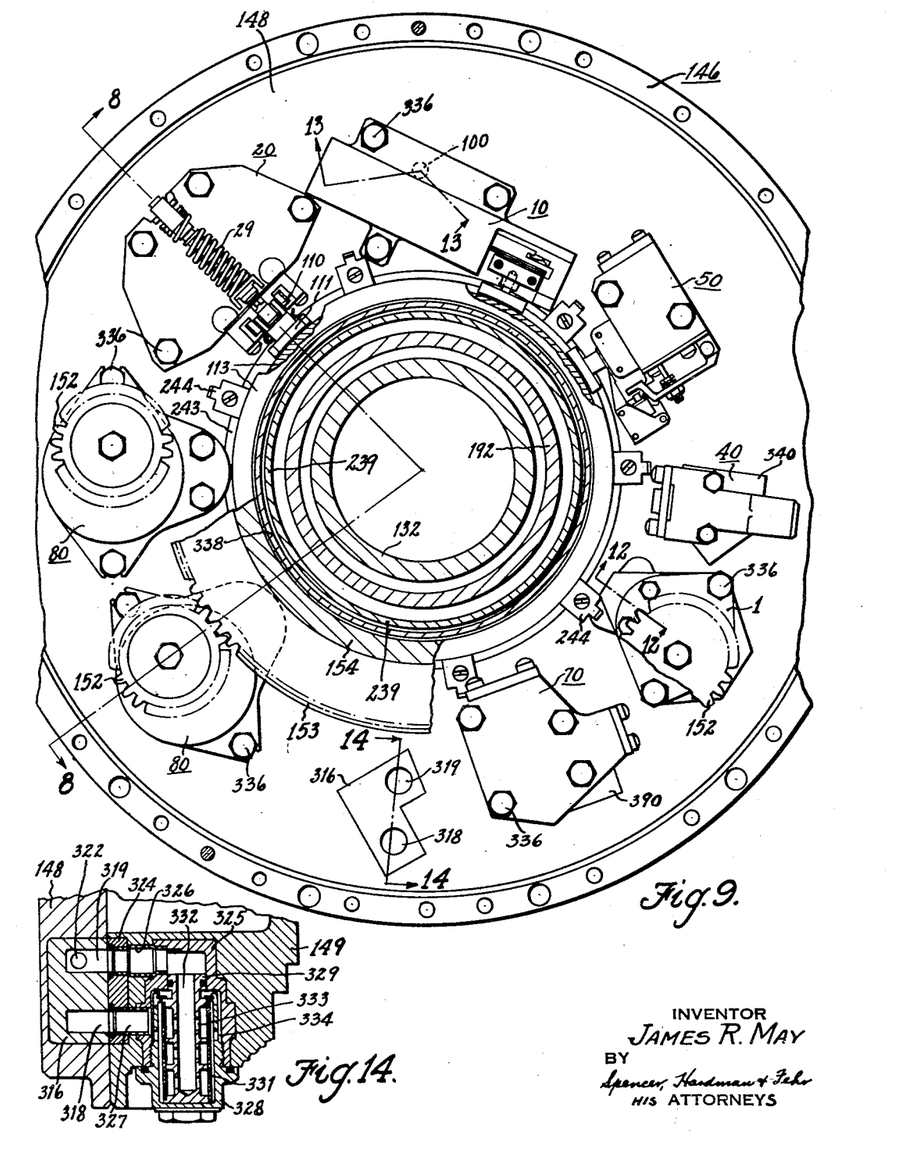
Fig. 9 is a view in section through the shaft and hub extension showing the inside surface of the regulator plate in plan with the control devices mounted thereon as suggested by the line and arrows 9—9 of Fig. 8.
Fig. 14 is a sectional view of a hydraulic detail to a fluid filter, substantially as indicated at 14—14 of Fig. 9.
Figures 10, 12, 13:
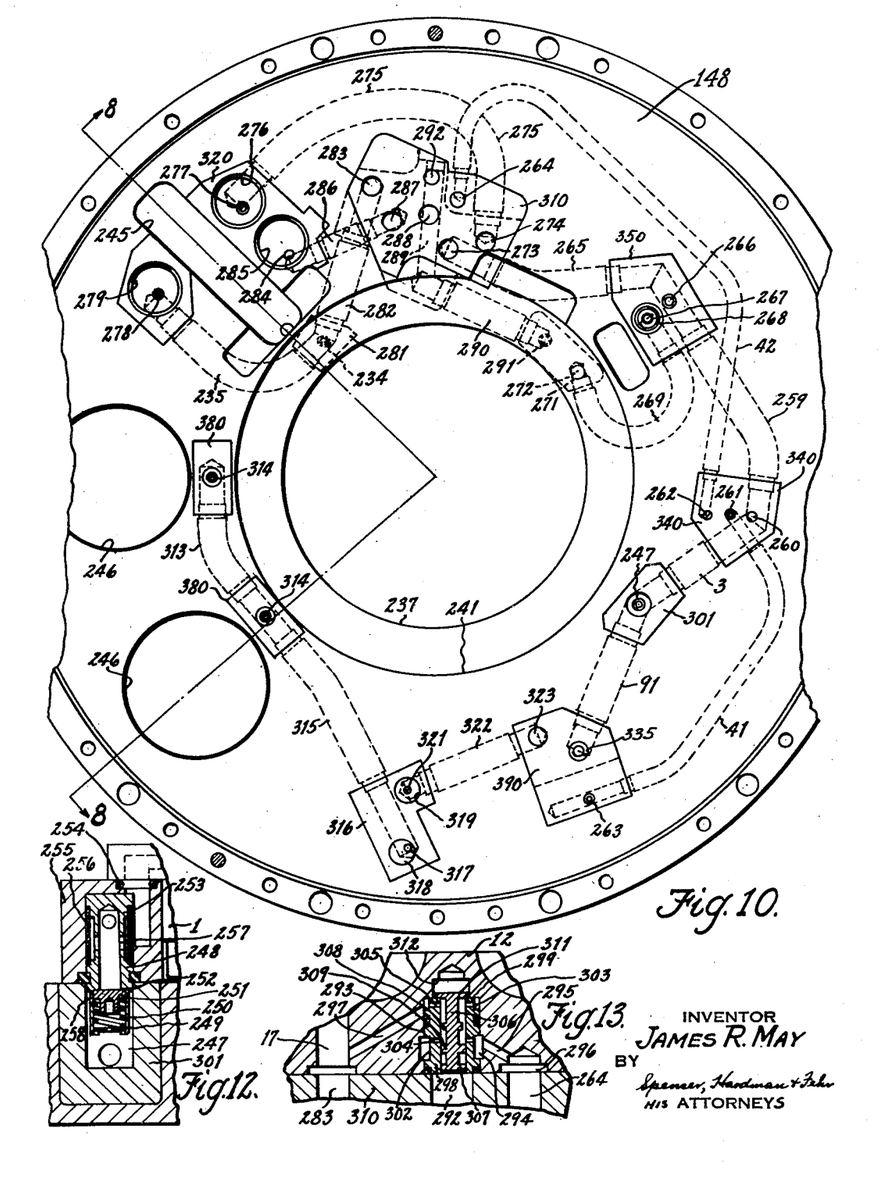
Fig. 10 is a plan view of the regulator plate with the control elements removed to illustrate the plumbing connections between the mounting pads by which the several devices become operative.
Fig. 12 is a detail section of the fluid connection between the primary pump and the hydraulic system, substantially as indicated at 12—12 of Fig. 9.
Fig. 13 is a detail in section showing hydraulic connections between the control passages and the pressure regulating device, it being a view as suggested by the line and arrows 13—13 of Fig. 9.

For detailed description of the regulator or governing apparatus reference is now made to Figs. 9 to 15 inclusive where the regulator plate 148 is shown to be of annular form and as having its inner periphery 237 seated on the juncture 238 of the hub and extension 192 where it is held in driving relation by dowels and a sleeve nut 239 threaded to the hub extension 192 at 240. On the inner surface of the plate 148 and adjacent the inner periphery 237 there is an annular channel 241 adapted to house a resilient seal ring 242 and an adapter bearing ring 243 which is held in place by several clips 244 attached to the plate. The regulator plate 148 is specifically constructed to embrace a tubage assembly communicating with suitable wells and ports for effecting the fluid connections functionally illustrated in Figs. 1 to 6 inclusive, and provides appropriate pockets and mounting pads for securement of the elements of the control devices. As shown in Figs. 9 and 10 the plate provides a pocket 245 receptive of a part of the governor valve 20, and a pair of pockets 246 receptive each of one of the auxiliary pumps 80. The tubage assembly is shown in Fig. 10, and embraces a number of tube elements joining junction blocks of relative hard material that in some instances also act as mounting pads for the particular control element to be attached. Accordingly, the junction blocks or mounting pads have been indicated by reference numerals corresponding to the part it supports but increased by 300. Thus the pad 301 supports the pump 1 while the pad 340 supports the pressure control valve 40 and so on.

In some instances more than one of the control elements may be mounted at one station. Thus, as respects the pad 301, the tube sections corresponding to the passages 3 and 91 both open into a well 247 housing the check valve 2 and communicating with the pump 1. The check valve assembly in its entirety is shown in Fig. 12, and comprises a tubular member 248 having a shell part 249 disposed in the well 247 and enclosing a spring 250 forcing a valve disc 251 against a seat 252, while a spool part 253 is covered by a junction or cap member 255 joining the outlet of pump 1 to the well 247, a seal ring 254 being interposed where necessary to stop fluid leakage. Embracing the spool portion 253 there is a filter screen 256 that operates to screen out any solid material picked up by the pump and delivered to the outside of the spool portion. The operating fluid after flowing through the screen 256 enters ports 257 of the spool portion to the bore of the tubular member and then displaces the valve 251 and flows through one or more side ports 258 in the shell portion 249 to the well 247 and thence on its way through 3 to the system in general. One end of tube section 3 joins a tube section 259 and opens through the pad 340 to the surface of the plate through port 260 that communicates with the chamber 43 of the variable pressure control valve 40. Other ports 261 and 262 in the pad 340 open properly to communicate with the passages or tube sections 41 and 42; tube section 41 leading to port 263 of the pad 390, while tube section 42 leads to port 264 for the shuttle valve 100 located on the pad 310.

Proceeding counterclockwise around Fig. 10, the tube section 259 joins pad 350 where it communicates with tube section 265 and opens by port 266 through the face of the pad to the chamber 51 of the feather valve 50, a second port 267 at the bottom of a well 268 opens to tube section 269 curved around to join a block 271 that provides a port 272 through the back of the plate connecting with passage 7 leading to the accumulator. The mounting pad 310 operates to mount both the range selector valve 10 and the shuttle valve 100, as well as to properly connect the ports thereof into the hydraulic system. One end of the tube section 265 is anchored to the pad 310 and opens to the face thereof by port 273 adapted to communicate with port 13 of the valve 10. A port 274 for connection with the valve port 14 opens into one end of tube section 275 leading to the pad 320 for the governor valve 20 and ending in a well 276 surrounding a port 277. The port 277 is adapted to connect with passages in the valve unit 20 to the pump supply port 21 thereof, while increase pitch port 23 of the valve unit is connected through the body of the valve to port 278 in well 279 of the pad 320 that supports tube section 235 leading to a pad 281 where there is joined tube section 282 leading to port 283 in the pad 310. At the juncture of tube sections 235 and 282 there is a port 234 extending through the back of the plate 148 to connect with the hub passage 145 as has been shown in Fig. 8. The decrease pitch port 22 of the valve unit 20 likewise connects with port 284 in the bottom of a well 285 in the pad 320 where communication is had with tube section 286 leading to port 287 in the pad 310, which port 287 is adapted to connect with valve port 15. Port 16 of the valve unit is adapted to connect with port 288 of the pad 310 that opens into a tube section or drill-way 289 of the pad connecting at one end with a tube section 290 ending in pad 271 with a port 291 opening through the back of the plate 148 to connect with control passage 144, similar to the showing in Fig. 8 for the port and passage 145. The other end of the drill-way 289 opens into a port 292 of the pad 310, at which port communication is had with one end of the shuttle valve 100 substantially as shown in Fig. 13.

As is indicated in Figs. 9 and 13, the shuttle valve 100 is incorporated as a physical part of the range selector valve 10, there being a well 293 provided in the body of the cylinder 12 disposed to open at one end over the port 292 of the pad 310, while an internal channel 294 opens by an oblique bore 295 into a pocket 296 adapted to mate with the port 264 of the pad 310. A second oblique bore 297 extends from the bottom end of the well 293 to open into the port 17 of the range selector valve which is adapted to line up with the port 283 when the valve unit is clamped in place as shown in Fig. 9 and Fig. 13. A porting sleeve 298 disposed in the well 293 seats at one end on a shoulder 299 and has grooves 302 and 303 for registry with the internal channel 294 and bore 295, and with the bore 297, there being cross ports 304 and 305 connecting the grooves 302 and 303 with the bore of the sleeve 298, within which slides a valve stem or plunger 306 corresponding to the element 104 of the shuttle valve 10 shown in Figs. 1 to 6. The plunger 306 is provided with two guide lands 307 and 308 of bar form slidable along the bore of the sleeve 298. These guide lands have wide diametric flats that allow the passage of fluid thereby lengthwise of the plunger. A third land 309 is of full area of the bore of the sleeve to provide piston faces and is so disposed between the lands 307 and 308 and with respect to the cross bore 304 of the porting sleeve that it may be moved to either side of said port 304. A flange 311 on one end of the plunger 306 is larger in diameter than the bore of the sleeve and cooperates with the end of the sleeve adjacent the shoulder 299, and with a second shoulder 312 at the bottom of the well 293 to act as a stop limiting the movement of the valve plunger 306. In the position shown in Fig. 13 the plunger is in position to connect the pitch increase line to the line 42 of the variable pressure control valve 40, through the elements 278, 279, 235, 282, 283, 17, 297, 302, 305, bore of sleeve 298, 304, 294, 295, and 264 to 42. When the governor valve applies fluid pressure to the decrease pitch port 22 the pressure will be applied through elements 285, 284, 286, 287, 15, 16, 288, 289, 292 to the flats on the sides of the land 307 and against the full area land 309 of the plunger 306. The plunger will thereby be moved upwardly as respects Fig. 13 until the flange 311 engages ledge 312 and opens 304 to 292 and permits the pressure from the decrease pitch line to flow through 294, 296 and 264 to the line 42. Also when pressure is applied to the increase pitch line the pressure present in bore 297 enters through 305 to force land 309 down as limited by the flange 311 and opens 305 to 304 and the line 42.

There are two pads 380 joined by tube section 313, both pads opening with ports 314 for communication with the outlet of the pumps 80 somewhat as shown in Fig. 8. A tube section 315 extends to a junction block 316 where it ends in a port 317 at the bottom of a well 318, there being a second well 319 and port 321 connected to a tube section 322 leading to pad 390 and ending in a port 323, where connection is made with the pump control valve and check valve. Mounted over the pad 316 to cooperate with the ports 317 and 321 there is a portion of the regulator cover 149 that embodies an externally removable filter assembly substantially as shown in Fig. 14, where the cover member 149 supports a juncture block 324 and a mounting pad 325 joined by tube sections 326 and 327 opening into a stepped bore of the pad 325 from the wells 318 and 319. Threaded into the end of the pad 325 there is a hollow cap 328 that encloses a spool member 329 supporting a filter screen 331, a central bore 332 opening to the tube section 326 and providing lateral ports 333 communicating with the inside of the screen, while the cap member 328 surrounding the screen is apertured at 334 to open to the tube section 327. The parts are so proportioned that there is no fluid path between the tube sections 326 and 327 except through the screen 331 which thereby filters out any solid material picked up by the pumps 80 and delivered through 315, 317, 318, and 327 to the outside of the screen. Unscrewing of the threaded cap 328 permits cleaning or replacement of the filter element.

The pad 390 has already been described as providing the ports 263 and 323 that communicate with the tube sections 41 and 322 respectively. It also provides a port 335 that opens into a tube section 91 leading to the port 247 of pad or block 301. The valve unit mounted over the pad 390 structurally embodies both the pump control valve 70 and the check valve 90 so that the connecting passage 72 is provided within the valve body, while the end of double land 1 is open to the port 263 of pad 390, and ports 335 and 323 of the pad 390 are adapted to connect with passages 72 and 71 respectively when the valve body 90 is secured in place. This structural application of the control elements for the propeller is the same functionally as the showing in the circuit diagrams of Figs. 1 to 6 and the schematic view of Fig. 7. It should be understood that when the valve units of the control apparatus are mounted on the regulator plate 148 of Fig. 10 that a substantially balanced arrangement will obtain somewhat as shown in Fig. 9 where the valve elements are shown attached by screw devices 336 passing through appropriate apertures or holes in the valve units and threading into the body of the plate or the mounting pads provided thereby. The holes for the mounting screws that would normally show in Fig. 10 have been omitted, since their inclusion would only tend to complicate the illustration. All parts mounted on the plate 148 are enclosed within the reservoir 147 by the cover 149 peripherally secured thereto by the screw devices 337, the inner bounds of the cover 149 embracing an adapter sleeve or control assembly 338 that surrounds the sleeve nut 239 and extends axially of the reservoir to telescope within the seal ring 242 and the bearing ring 243.

The adapter sleeve 338 provides support for the flanged sleeve 154 described in connection with Fig. 7, and which carries the toothed flange 153 driving the pump gears 152. The sleeve 338 is oscillatable within the member 154 for axial movement of the control ring 113 as will presently appear, while the sleeve 154 remains fixed relative to the engine nosing 130 as has been explained. Here a facing ring 339 covers the end of the sleeve 338 and is spaced therefrom by spacers 341, and screw devices passing through the ring 339, spacers 341 thread into the body of sleeve 154 to make a rigid assembly. A notch 342 of the facing ring engages over a tongue 343 of a ring 344 on the engine nose 130 retains the assembly against rotation with the regulator. Between the facing ring 339 and the end of the sleeve 154 there is a ring 345 having an arm 346 to which is attached the control rod or cable 160, and the ring 345 has driving relation with the sleeve 338, such as by alternating tongues and notches or interrupted flanges, so that oscillation of the ring 345 will also oscillate the sleeve 338 relative to the sleeve 154 which supports them. The member 154 provides a race for a series of balls 347 supported by a bearing member 348 secured to the cover 149 of the regulator by screw devices 349 while a keeper ring 351 and seal ring 352 carried by the cover provide an assurance against leakage of fluid from the reservoir. By these bearings, it is assured that the adapter assembly will always be concentric with the regulator rotation, so that there will be no undue binding of friction in the moving parts engaged or operated by the adapter assembly as the regulator rotates.

For relieving the reservoir 147 from excessive pressure, there is provided a relief valve 353 which is shown in enlarged section in Fig. 15, where the sleeve 154 provides an axial extending bore 354 with an enlargement 355 providing a seat 356 engaged by a valve plunger 357 under the urge of a spring 358 engaging a screw plug 359, while a passage 361 opens the enlargement 355 to the outside of the reservoir. The bore 354 joins a radially extending drill passage 362 located in the flange 153, the outer end of the drill passage 362 opening into a cross passage 363 which is always well above the liquid in the reservoir 147 even when the stored energy of the accumulator is expended and the full volume of the liquid is in the reservoir.

For transferring motion of the rod or cable 160 to the carriages 110, 115, 119 and the like, the sleeve 154 is extended to the left within the reservoir 147 as shown at 364 in Fig. 8, where it supports the control ring 113 in the usual manner to be moved along the length thereof toward and away from the regulator plate 148. At a plurality of points, usually three, the extension 364 has a straight narrow slot 365 parallel with the axis of propeller rotation, and in which there is disposed a roller 366 carried by a pin 367 secured in the control ring 113, a second roller 368 on the same pin being located in an oblique slot 369 provided by the sleeve 338. Since the sleeve 338 is oscillatable by movement of the cable or rod 160 the point of intersection of the slots 365 and 369 will be varied, and the rollers 366 and 368 following the contour of the slots will cause the carriages to move toward or from the regulator plate as the sleeve 338 is oscillated in one direction or the other with respect to the member 154. The control point of the member 160 is located in the pilot's compartment, and when actuated to call for any of the functions within the capacity of the control apparatus, will so actuate the carriages within the regulator, that the proper adjustment of the elements are promptly made for effecting the selected operation.

While the embodiment of the present invention as herein disclosed, constitutes a preferred form, it is to be understood that other forms might be adopted, all coming within the scope of the claims which follow.

What is claimed is as follows:

1. A hydraulic system for control of blade pitch of a variable pitch propeller through the full range of flight conditions, comprising in combination, a blade shifting motor, a system pump and a speed responsive governor valve with interconnecting passages for actuation of the blade shifting motor, a variable pressure control valve exposed to the output of said system pump for limiting the pressure in said interconnecting passages to a relatively low potential during governed control of said blade pitch for constant speed, and for immediately applying the full potential output of said system pump to the interconnecting passages during shift of blade pitch to satisfy a selected other basic setting within the range, an auxiliary pump whose output is normally segregated from the output of said system pump, means including said variable pressure control valve and connections to said blade shifting motor for coupling the output of said auxiliary pump to the output of said system pump upon shift of blade pitch from one range to another, and a range selector valve for selecting the range of pitch settings for the blade operation, said selector valve when selecting a negative range of blade operation disabling the operation of said governor valve.

2. A hydraulic system for control of blade pitch of a variable pitch propeller through the full range of flight conditions, comprising in combination, a double acting fluid servo-motor for shifting the blades, a fluid pressure line for supplying fluid under pressure to the servo-motor, a speed responsive governor valve for applying the fluid under pressure to the servo-motor in response to variations from a selected setting, means for setting the governor valve at a basic value to which it will control, a system pump constantly feeding into said fluid pressure line, an auxiliary pump bypassing said fluid pressure line, a variable pressure control valve exposed to the pressure of said fluid pressure line and responsive to the pressure applied to said servo-motor for controlling the potential of pressure in said fluid pressure line, and a pump control valve operating under control of said variable pressure control valve to connect the auxiliary pump or pumps with the fluid pressure line when the controlled potential of the fluid pressure line fails to meet the needs of said servo-motor, and a range selector valve actuated in response to predetermined movement of the governor setting means for connecting the fluid pressure line directly with the servo-motor and bypassing the said governor.

3. A hydraulic system for control of blade settings of a variable pitch propeller through the full range of flight conditions including minute power applications incident to constant speed operation and vast power applications incident to feathering, braking and return to positive pitch setting, the combination comprising, a double acting fluid operated servo-motor capable of actuating the blades throughout their full range, a fluid pressure supply with connections for operating the servo-motor and including, an adjustable governor for sensing changes to be made in blade setting and for applying fluid pressure delivered thereto to the servo-motor, pressure control valve means exposed to the fluid pressure supply and reflecting the needs of power applied to the servo-motor for maintaining a low pressure potential at the governor valve when minute power applications are desired, and for increasing the pressure potential at the governor valve when greater power applications are desired, a selector valve for disconnecting the governor valve and for connecting the fluid pressure supply directly to the servo-motor, said pressure control valve means then reflecting the maximum power needs as then applied to said servo-motor and operating to increase the pressure potential from said fluid pressure supply.

4. In a hydraulic system for control of blade pitch of a variable pitch propeller, the combination comprising, a blade actuating servo-motor, a governor valve for application of fluid pressure to the servo-motor, selective means for setting the governor valve to effect a plurality of governed positive pitch conditions, negative, and feathering pitch conditions requiring a wide range of pressure applications to the servo-motor, a source of fluid medium, a pump delivering the fluid under pressure to the system and providing a surplus of fluid under pressure beyond what is normally needed by the governor for effecting governed positive pitch at any setting of the selective means, pressure control means for regulating the potential of pressure applied to the servo-motor for all said conditions including a pressure control valve for diverting a large surplus of fluid under pressure from said pump from that needed by the governor in effecting governed positive pitch at any setting of the selective means, and valve means responding to fluid pressure applied to said servo-motor for biasing said pressure control valve to divert a lesser surplus of fluid under pressure from said pump and that needed by the governor in effecting a change from one governed positive pitch condition to another selected by said selective means, an additional pump adapted to deliver fluid under pressure to said system, and valve means responding to the surplus of fluid diverted by said pressure control valve for connecting and disconnecting said additional pump to the system.

5. In a hydraulic system for control of blade pitch of a variable pitch propeller, the combination comprising, a blade actuating servo-motor, a governor valve for application of fluid pressure to the servo-motor, selective means for setting the governor valve to effect a plurality of governed positive pitch conditions, negative, and feathering pitch conditions requiring a wide range of pressure applications to the servo-motor, a source of fluid medium, a pump delivering the fluid under pressure to the system and providing a surplus of fluid under pressure beyond what is normally needed by the governor for effecting governed positive pitch at any setting of the selective means, pressure control means for regulating the potential of pressure applied to the servo-motor for all said conditions including a pressure control valve for diverting a large surplus of fluid under pressure from said pump from that needed by the governor in effecting governed positive pitch at any setting of the selective means and valve means responding to fluid pressure applied to said servo-motor for biasing said pressure control valve to divert a lesser surplus of fluid under pressure from said pump and that needed by the governor in effecting a change from one governed positive pitch condition to another selected by said selective means, an additional pump operating during governed positive pitch conditions drawing fluid from and returning to said source of fluid medium, and valve means exposed to the surplus of fluid under pressure diverted by the pressure control valve for connecting and disconnecting said additional pump to the system, said last named valve means responding to absence of diverted surplus of fluid for adding the output of said additional pump to the output of said first mentioned pump when the needs for fluid under pressure to be delivered to the servo-motor exceeds the full capacity of said first recited pump.

6. In a hydraulic system for control of blade pitch of a variable pitch propeller, the combination comprising, a blade actuating servo-motor, a governor valve for application of fluid pressure to the servo-motor, selective means for setting the governor valve to effect a plurality of governed positive pitch conditions, negative, and feathering pitch conditions requiring a wide range of pressure applications to the servo-motor, a source of fluid medium, a pump delivering the fluid under pressure to the system and providing a surplus of fluid under pressure beyond what is normally needed by the governor for effecting governed positive pitch at any setting of the selective means, pressure control means for regulating the potential of pressure applied to the servo-motor for all said conditions including a pressure control valve for diverting a large surplus of fluid under pressure from said pump from that needed by the governor in effecting governed positive pitch at any setting of the selective means, and valve means responding to fluid pressure applied to said servo-motor for biasing said pressure control valve to divert a lesser surplus of fluid under pressure from said pump and that needed by the governor in effecting a change from one governed positive pitch condition to another selected by said selective means, an additional pump whose intake is connected with said source of fluid medium, and valve means responding to surplus diversion of fluid under pressure by said pressure control valve for returning the output of said additional pump to the said source of fluid medium so long as the first mentioned pump supplies the needs for fluid pressure application to said servo-motor, and said last recited valve means responding to the absence of diverted surplus fluid under pressure for connecting the output of said additional pump to the system for effecting other than governed positive pitch conditions.

7. In a hydraulic system for control of blade pitch of a variable pitch propeller, the combination comprising, a blade actuating servo-motor, a governor valve for application of fluid pressure to the servo-motor, selective means for setting the governor valve to effect a plurality of governed positive pitch conditions, negative, and feathering pitch conditions requiring a wide range of pressure applications to the servo-motor, a source of fluid medium, a pump delivering the fluid under pressure to the system and providing a surplus of fluid under pressure beyond what is normally needed by the governor for effecting governed positive pitch at any setting of the selective means, pressure control means for regulating the potential of pressure applied to the servo-motor for all said conditions including a pressure control valve for diverting a large surplus of fluid under pressure from said pump from beyond that needed by the governor in effecting governed positive pitch at any setting of the selective means, and valve means responding to fluid pressure applied to said servo-motor for biasing said pressure control valve to divert a lesser surplus of fluid under pressure from said pump and that needed by the governor in effecting a change from one governed positive pitch condition to another selected by said selective means, an additional pump whose intake is connected with said source of fluid medium, and a pump control valve acting so long as a surplus of fluid under pressure is diverted by said pressure control valve to return the output of said additional pump to said source of fluid medium, means including a fluid connection with the pressure control valve whereby said pump control valve responds to an absence of diverted fluid under pressure to connect the output of the additional pump to the system for effecting other than governed positive pitch conditions called for by said selective means.

8. In a hydraulic system for control of blade pitch of a variable pitch propeller, the combination comprising, a blade actuating servo-motor, a governor valve for application of fluid pressure to the servo-motor, selective means for setting the governor valve to effect a plurality of governed positive pitch conditions, negative, and feathering pitch conditions requiring a wide range of pressure applications to the servo-motor, a source of fluid medium, a pump delivering the fluid under pressure to the system and providing a surplus of fluid under pressure beyond what is normally needed by the governor for effecting governed positive pitch at any setting of the selective means, an accumulator and control valve therefor connected with said system and adapted to charge the accumulator from said surplus of fluid, pressure control means for supplying the potential of pressure required to be applied to the servo-motor for effecting any of the selectable pitch conditions, including a pressure control valve for diverting a surplus of fluid under pressure provided by said pump from that needed for effecting governed positive pitch conditions and the charging of said accumulator and for returning that surplus of fluid to the said source of fluid medium valve means with connections to said servo-motor and to said pressure control valve for reducing the amount of surplus fluid under pressure diverted by said pressure control valve and for correspondingly increasing the fluid under pressure for application to the servo-motor in effecting a different governed positive pitch condition, an additional pump supplied by said source of fluid medium, a pump control valve responding to surplus of fluid under pressure returned to the source of fluid medium for returning the output of said additional pump to the source of fluid medium, and responding to the absence of returned surplus of fluid for connecting the output of said additional pump to the system for effecting pitch conditions needing greater pressure applications to the servo-motor than for effecting a change in governed positive pitch conditions, connections actuated by setting of the selective means to feathering pitch conditions for opening the charged accumulator to the system for application to the servo-motor, to assist both of said pumps in effecting the feathering pitch condition.

9. In a hydraulic system for control of blade pitch of a variable pitch propeller, the combination comprising, a blade actuating servo-motor, a governor valve for application of fluid pressure to the servo-motor, selective means for setting the governor valve to effect a plurality of governed positive pitch conditions, negative, and feathering pitch conditions requiring a wide range of pressure applications to the servo-motor, a source of fluid medium, a pump delivering the fluid under pressure to the system and providing a surplus of fluid under pressure beyond what is normally needed by the governor for effecting governed positive pitch at any setting of the selective means, a range selector valve inserted in the system between said pump and the governor valve for determining whether the servo-motor will actuate the blades in the positive or negative pitch conditions, means connected with the range selector valve and responsive to setting of the selective means to effect negative pitch conditions for disconnecting the pump from the governor valve and connecting the pump directly with one side of the servo-motor, an accumulator, an accumulator control valve assembly connecting the accumulator with said system and adapted to charge said accumulator from said surplus of fluid, pressure control means for supplying the potential of pressure required to be applied to the servo-motor for effecting any of the selectable pitch conditions, including a pressure control valve for diverting the surplus of fluid under pressure provided by said pump from that needed for effecting governed positive pitch conditions, and for charging said accumulator, a shuttle valve with connections to said servo-motor and to said pressure control valve for reducing the amount of surplus fluid under pressure that is diverted and for increasing the potential of the fluid under pressure for application to the servo-motor in effecting a change to a different governed positive pitch condition, an additional pump for said system, a pump control valve responding to the surplus of fluid under pressure diverted by the pressure control valve for returning the output of said additional pump to the source of fluid medium, and responding to the absence of returned surplus of fluid for connecting the output of said additional pump to the system to assist the first mentioned pump in applying fluid under pressure to the servo-motor in effecting negative pitch condition, and the start of feathering pitch condition, and connections actuated by setting of the selective means to feathering pitch condition for connecting the charge of the accumulator to the system for completing the feathering pitch condition.

JAMES R. MAY.

REFERENCES CITED

The following references are of record in the file of this patent:

UNITED STATES PATENTS

| Number | Name | Date |
|---|---|---|
| 2,216,416 | Mader | Oct. 1, 1940 |
| 2,296,288 | Martin et al. | Sept. 22, 1942 |
| 2,307,101 | Blanchard et al. | Jan. 5, 1943 |
| 2,307,102 | Blanchard et al. | Jan. 5, 1943 |
| 2,320,195 | Rindfleisch | May 25, 1943 |
| 2,343,416 | Keller | Mar. 7, 1944 |
| 2,353,566 | Keller | July 11, 1944 |
| 2,391,699 | Haines et al. | Dec. 25, 1945 |
| 2,402,065 | Martin | June 11, 1946 |
| 2,423,191 | Kopp | July 1, 1947 |